United States Patent [19]

van Wegen

[11] Patent Number: 4,533,033

[45] Date of Patent: Aug. 6, 1985

[54] MECHANISM FOR ROTATING AN OBJECT OVER A DETERMINED ANGLE ABOUT A VERTICAL AXIS

[75] Inventor: Wilhelmus F. S. M. van Wegen, Maartensdijk, Netherlands

[73] Assignee: Metaverpa B.V., Maartensdijk, Netherlands

[21] Appl. No.: 452,926

[22] Filed: Dec. 27, 1982

[30] Foreign Application Priority Data

Dec. 30, 1981 [NL] Netherlands .......................... 8105908

[51] Int. Cl.³ ............................................ B65G 47/24
[52] U.S. Cl. .................... 198/413; 414/433; 414/757; 100/14; 193/45; 193/35 SS
[58] Field of Search ................ 198/413, 414; 193/45, 193/35 SS; 414/433, 754, 757; 100/14, 26, 7

[56] References Cited

U.S. PATENT DOCUMENTS

| 1,179,035 | 4/1916 | Prouty | 414/433 X |
|---|---|---|---|
| 2,905,078 | 9/1959 | Laine | 100/14 |
| 3,147,691 | 9/1964 | Hogsten | 100/7 |
| 3,295,660 | 1/1967 | Nelson | 198/414 |
| 3,628,650 | 12/1971 | Rouse | 198/414 X |
| 3,973,672 | 8/1976 | Frost | 198/412 |
| 4,406,219 | 9/1983 | Mosca | 100/7 |

FOREIGN PATENT DOCUMENTS

| 2245505 | 3/1974 | Fed. Rep. of Germany . |
| 7405168 | 10/1974 | Netherlands . |
| 236320 | 1/1969 | U.S.S.R. ............... 198/414 |

Primary Examiner—Robert J. Spar
Assistant Examiner—Jonathan D. Holmes
Attorney, Agent, or Firm—Watson, Cole, Grindle & Watson

[57] ABSTRACT

A mechanism for rotating about a vertical axis generally flat-bottomed objects which are moving along the working surface of a conveyor system, the mechanism including at least three rollers which are rotatable about horizontal axes and which are oriented so as to be tangent to the circumference of a circle which is concentric with the vertical axis, a support frame for moving the rollers into an active positioning above the working surface of the conveyor system and downwardly to an inactive positioning therebelow, and a belt drive system for rotating all of the rollers in the same direction with respect to the circumference of the circle.

6 Claims, 3 Drawing Figures

MECHANISM FOR ROTATING AN OBJECT OVER A DETERMINED ANGLE ABOUT A VERTICAL AXIS

BACKGROUND OF THE INVENTION

1. Field of the Invention

The invention is related to a mechanism for rotating a generally flat-bottomed object which is located on a conveyor system over a determined angle about a vertical axis.

2. The Prior Art

Such a mechanism is known, namely in the shape of a rotating disc on which the object has to be pushed and from which it has to be pushed again after rotation. This only will occur slowly, so that this known rotating mechanism forms an obstacle for rapid conveyance. For a strapping device it is further known to provide means on either side of the strap up plane, which means are movable transversely to the conveying direction, of which means one may grip on the object near one end and the other near the other end and which are able to rotate the object a quarter of a turn. This mechanism requires a lot of space, is only suitable for objects with adapted dimensions and during rotation friction occurs.

The object of the invention is to provide a mechanism that is very simple in construction and requires little space while the time period necessary for performing the rotational movement is small. In particular, the invention aims at providing a mechanism for rotating an object to be strapped up in a strapping machine adapted to make straps crossing each other and in particular in such a manner that the rotation does not form an interruption in the strapping process.

SUMMARY OF THE INVENTION

The aimed objects in the first place are obtained by the fact that the mechanism comprises at least three rollers that are rotatable about a horizontal axis and that move upwardly and downwardly in concert, which rollers in inactive position are below the working face of the conveyor system and in active position extend at least partly above that working face, which rollers in the active position can be driven in the same direction which for all rollers is tangent to the circle of an arc of a circle belonging to the angular rotation that has to be performed. The rotating mechanism according to the invention can be applied in a lot of conveyor systems. If for instance an object that is supplied by a conveyor belt or roller track to a platform has to be discharged therefrom in another direction, then it is sufficient to provide this platform with a rotating mechanism according to the invention, for by moving the rollers to above the working face of the platform and driving them for a short time period the object is rotated about the desired angle and so after retracting the rollers is on the platform in another position from which it can be moved further in the desired direction. It will be clear that it is possible to effect movements in different directions dependent on the time period of the driving of the rollers.

The mechanism according to the invention, however, is preferably embodied in such a manner that the rollers are positioned in openings in the working table, that the conveyor system comprises a number of belts extending along each other in conveying direction, of which belts at least one extends until an opening and at least one extends along the edge of each opening. In such an embodiment practically no interruption occurs of the conveying system, that extends to and along the openings in which the upwardly and downwardly movable rollers of the rotating mechanism are present. In case rotation is not necessary the object moves simply with the aid of the conveying system over the openings and no platform is necessary to support the object. The disadvantage of a platform is that separate means are necessary to move the object from it again and to position the object on the means moving the object from the conveyor system adjoining the platform.

Preferably the means for driving the rollers comprise one or more belts. In this way it can be ascertained that all rollers in a simple way are driven in the same direction and with the same velocity.

Preferably the belts themselves form the gripping face of the rollers and the latter comprise flat discs with a groove for the belt about the outer circumference. The belt itself preferably has a circle shaped cross section so that the contact face with the flat lower side of the object to be rotated is as small as possible.

According to a further embodiment the rollers can be cones with the top directed to the center of the rotating circle and tangent to a horizontal face present above the rotational axes of the cones. The drive belts then are present on a diameter that may remain out of touch with the object.

According to the invention the drive belt or belts also may extend along belt discs of a shaft or of shafts, that forms or form a part of the drive mechanism of the conveying system in such a manner that in case the conveyor system is activated the rollers for rotating an object also are driven. Such a drive is simple and can easily be performed in such a manner that the upwardly and downwardly movement of the rollers do not influence the tension of the belts. In case the conveyor system is stopped then also the object that possibly is present thereon is stopped.

In case the conveyor system moves with the rollers in the retracted position then the object can be moved over the rotating mechanism. However, in case the conveyor system is driven while the rollers at the same time are moved upwardly out of the working face, then no conveying occurs but indeed rotation of the object about the vertical axis until the conveyor system is stopped again. Preferably the device is such that the movement above the working face of the rollers takes place before the conveyor system comes into action. These embodiments are significant in each conveyor system in which a rotation of the object is necessary. Therefor they are also meaningful for a strapping device that has to form straps crossing each other. In a strapping device a switch system is known with the aid of which automatically two spaced straps can be provided, in which between the first and the second strap the conveyor system moves the object to be strapped over the required distance under control of a control means. This control means may comprise an adjustable time relais, but also can be formed by abutments or light rays that can be interrupted.

According to the invention it is now possible that the center of the mechanism for the rotation of an object is present in or near said strapping plane and the switch diagram is completed in such a manner that in the phase for further conveyance after the first strap and before the second strap the movement upwardly of the rotating mechanism, the switching on of the conveying system and the switching off of it and also the movement downwardly of the rotating mechanism may take place.

In this way it is achieved that in the strapping device the phase between the first and the second strap is used for rotating the object in such a manner that the second strap is directed perpendicularly to the first strap. In this case no time is lost and the time relais can easily be adjusted in such a manner that the time period present between the first and the second strap corresponds with the time period necessary for a rotation about 90°.

The invention now will be elucidated with the aid of the attached drawings.

DETAILED DESCRIPTION OF THE PREFERRED EMBODIMENT

Figure 1:
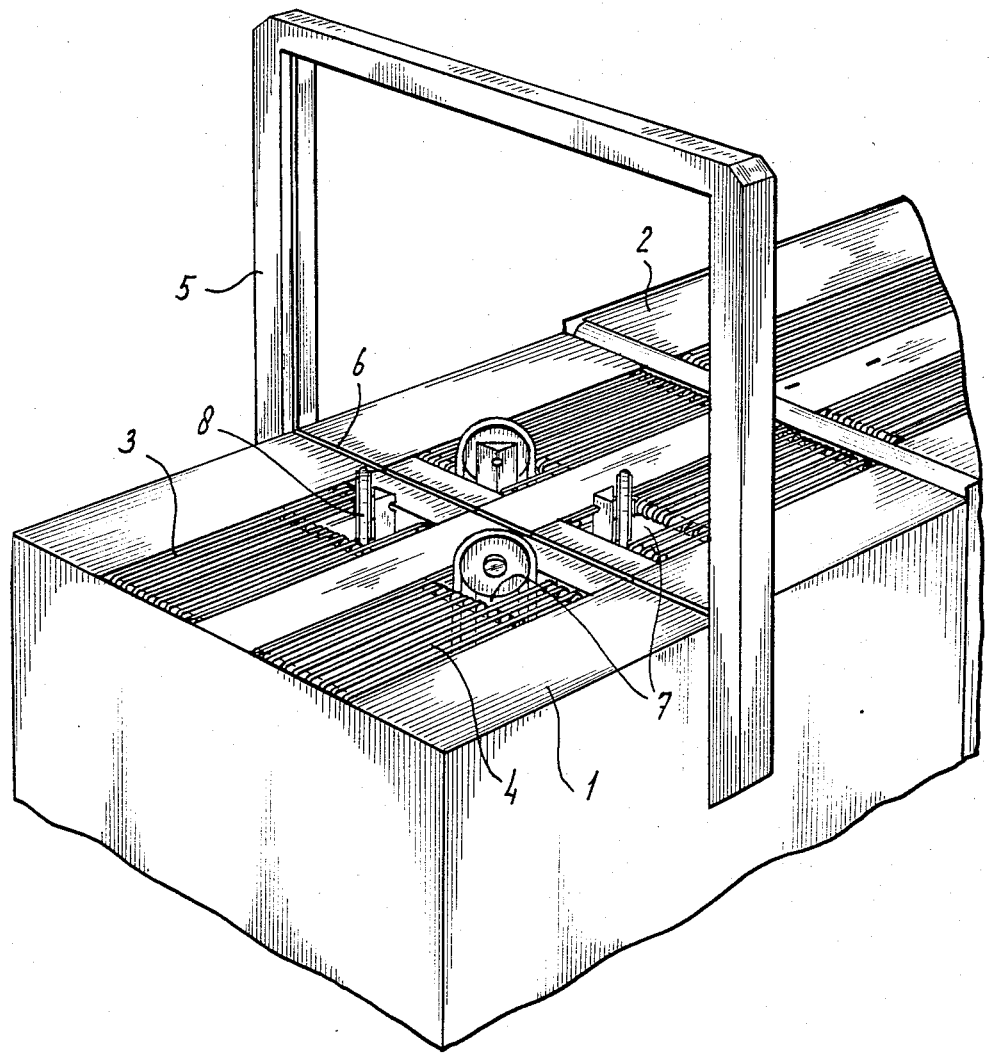
FIG. 1 shows a strapping device in perspective provided with the mechanism according to the invention.
Figure 2:
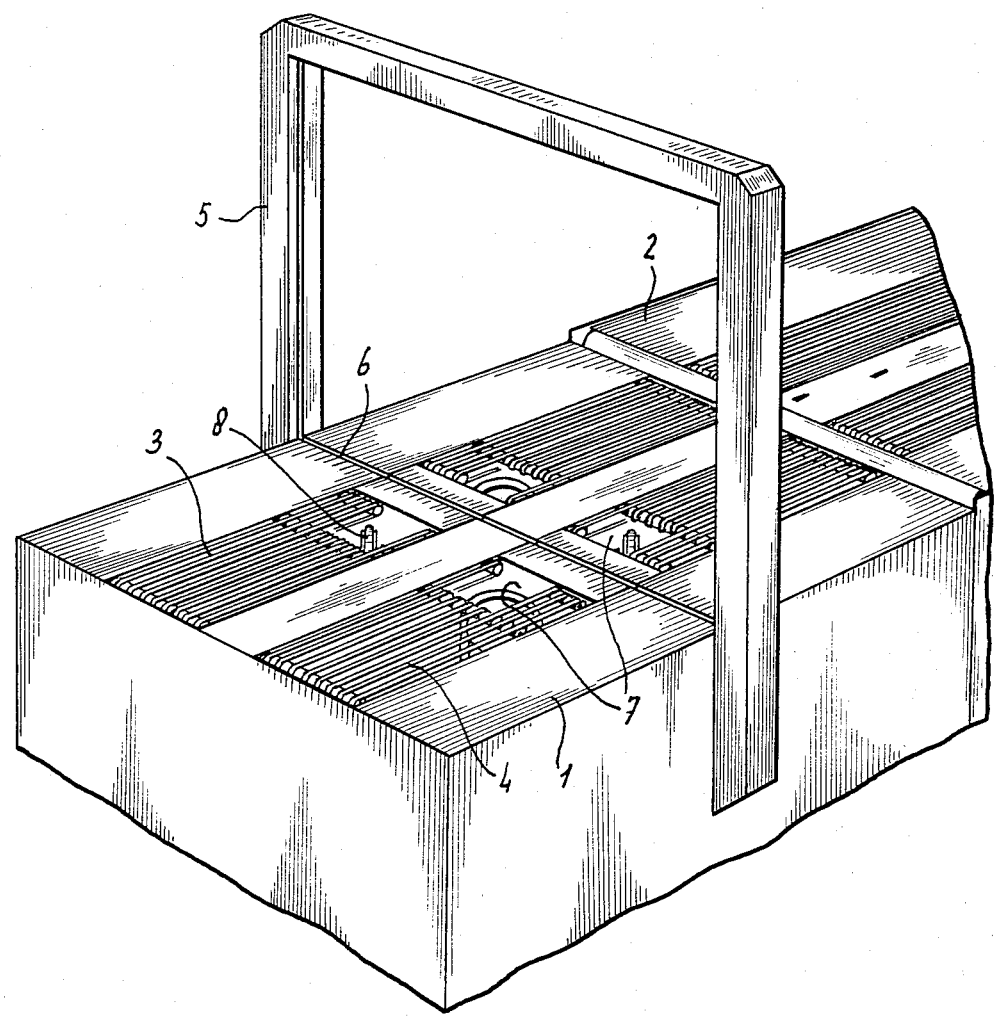
FIG. 2 shows the same machine as in FIG. 1 in another working position.

FIGS. 1 and 2 show a strapping device with a working table 1 and a supply table 2. Both tables 1 and 2 are provided with a conveying system comprising two tracks 3 and 4, each comprising a plurality of conveyor belts extending parallel to each other and having a circle-shaped cross section. The strapping device comprises a strap guide frame 5 and to allow for the strap to be formed the working table is interrupted by a slot 6. The conveyor system is interrupted by the slot 6 with the upstream and downstream portions of the conveyor system at a short distance from each other on either side of the slot.

In the working table four rectangular openings 7 are provided and FIGS. 1 and 2 show that some of the belts of the conveyor system terminate their path of travel in the conveying direction toward the slot 6 at a transverse edge of each of the openings 7 whereas some of the belts terminate their path of travel in the conveying direction toward the slot 6 at a point closer to the slot 6, at least one of these latter belts extending along an outer longitudinal edge of each of the openings 7.

In FIG. 1 the rollers 8 of the rotating mechanism are shown in their position above the working face 1.

In FIG. 2 the same rollers are shown in the retracted position. In the retracted position shown in FIG. 2 an object that has to be strapped up, such as a stack of newspapers, a box or another object, can be provided on the spot of the strap up frame with a strap, if desired with a plurality of spaced straps.

In case a strap is made over about the middle of the object and the rotating rollers move upwardly out of the working plane, as shown in FIG. 1, then the object is rotated, after which a next strap can be provided crossing the preceding strap. The mechanism that is used for this matter is shown in detail in FIG. 3.

This mechanism comprises four columns 9, 10, 11 and 12, of which the columns 9 and 10 form a unity with the horizontal beam 13 and the columns 11 and 12 with the horizontal beam 14. These again are mutually coupled with the aid of downwardly-directed extensions 15 and 16 of the columns 9 and 12 and the horizontal connecting bridge 17. On latter a pressure cylinder may act with the aid of which the above described mechanism can be moved upwardly and downwardly in vertical direction of the columns 9 to 12 inclusive as a unit.

Each column 9, 10, 11 and 12 respectively has at its upper end a roller 8 comprising a flat disc provided with a half circle shaped groove.

The rollers 8 of the columns 9 and 10 are driven by a belt 18 with circle shaped cross section, which extends from a driving disc 19 on the shaft 20, seen in driving direction, over the guide wheel 21, the wheel 8 of the column 9, the guide wheel 22 and the guide wheel 23 and subsequently about the roller 8 positioned at the upper side of the column 10 and subsequently back downwardly about the guide wheel 24 to the driving wheel 19. The wheels 21 and 22, 23 and 24 are free rotatably positioned on pins that are connected to the beam 13.

The shaft 20 is fixedly but rotatably supported in the frame of the machine and is synchronically driven with the belt of the conveyor system shown in FIGS. 1 and 2, and preferably with the same velocity.

This shaft has a second drive wheel 25 with the aid of which a second belt 26 extends about the guide wheel 27 to the wheel 8 on the upper side of the column 12 subsequently downwardly about guide wheels 28 and 29 to the wheel 8 positioned at the upper side of the column 11 and then back via the guide wheel 30 to the drive wheel 25. The wheels 8 on the upper side of the columns 9 to 12 inclusive are rotatable about axes positioned in a common horizontal plane and are directed to a common center. The rollers 8 that are free rotatably supported on these shafts are formed by flat discs that are tangent to a circle. This means that the upper points of the curve of the belts extending about the rollers 8, when driven have a working direction that at the spot of all rollers is tangent to a common circle through these points 31 with the work lines all in the same circumferential direction of this circle. An object that is present on these points 31 so will be rotated while the belts are driven about the center line of the circle.

Figure 3:
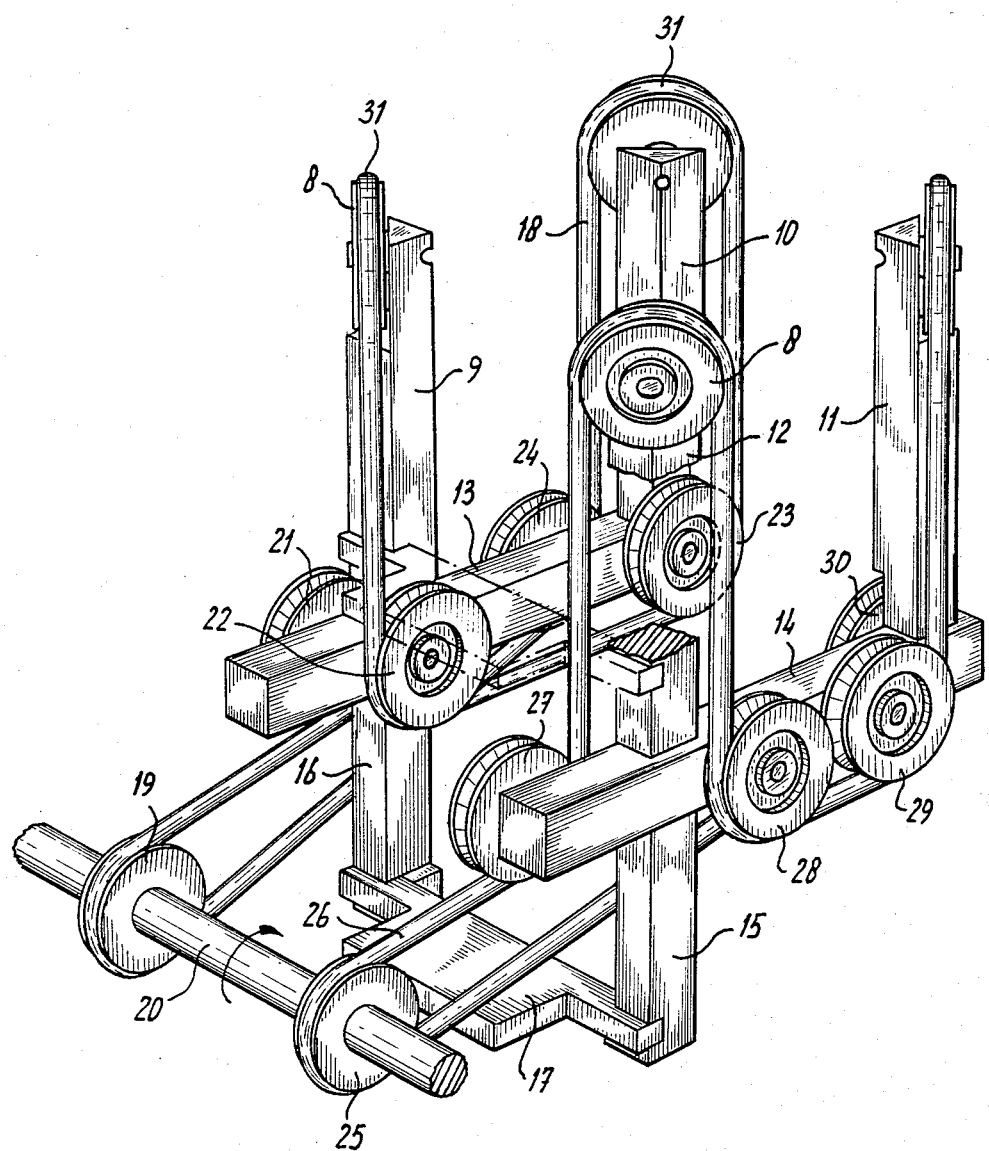
FIG. 3 shows the rotating mechanism on a larger scale and in perspective view.

In the embodiment shown in FIG. 3 two belts 18 and 26 are necessary to move the rollers 8, with the common drive shaft 20 and the chosen arrangement of the guide wheels, also in the correct direction.

The shaft 20 is laterally next to the vertically upwardly and downwardly movable columns by which this movement is possible without disadvantageous influencing the tension in the belts 18 and 26.

It is of course possible to provide a drive with a single belt for all rollers or with separate belts for each roller.

The strapping machine shown in the FIGS. 1 and 2 is of a known type. This machine is embodied in such a manner that, in case a light ray is interrupted by a supplied object, a time relay is activated that takes care of the fact that the object will be stopped in the correct position for providing a first strap. This time relay is adjustable in such a manner that a first strap can be provided on a position in the middle plane of the object but also at positions spaced from this middle plane, in which case a second time relay after providing the first strap takes care of the fact that the object is displaced along a determined distance by the conveyor system after which the second strap is provided.

This second time relay now can be used in a useful way in this known machine for controlling the rotation. The first time relay then is in a position necessary for providing a first strap about in the middle plane of the object. After providing this first strap, the conveyor system controlled by the second time relay comes into action again but at the same time or preferably a little bit earlier the rotating mechanism is moved upwardly, so only the tops 31 of the belts on the rollers 8 grip the object. This then is rotated in the same time period that in another way should be used for the axially further displacement of the object. After retracting the rotating mechanism, the object again rests on the conveyor system that comes into action again as soon as the second strap is provided, that crosses the first one.

In this way very rapidly straps can be provided that cross each other; this is of particular importance in case strapping up of newspapers, parcels or such is involved.

Further, it will be clear that the mechanism according to the invention can be provided in a simple way in the existant design of a strapping machine.

I claim:

1. In a strapping machine which includes a strapping mechanism and a conveyor system for rectilinearly moving objects to and away from said strapping mechanism, the strapping mechanism being operative in a vertical plane which is perpendicular to said rectilinear direction of movement of said objects, the improvement wherein said conveyor system includes a working surface and four openings extending therethrough, two of said four openings being located on one side of said vertical plane and the remaining two of said four openings being located on the opposite side of said vertical plane; and wherein an object-turning mechanism is operatively positioned below the working surface of said conveyor system, said object-turning mechanism including a support frame, four rollers mounted on said support frame, said four rollers being positioned to be simultaneously positionable in a respective one of said four openings in the working surface of said conveyor system, each roller being rotatable about a horizontal axis and oriented so as to be tangent to the circumference of a common circle, two endless belts for rotating said four rollers in the same direction with respect to the circumference of said common circle, a first of said two endless belts driving a first pair of said rollers which are located on respective opposite sides of said vertical plane and a second of said two belts driving the second pair of said rollers which are located on respective opposite sides of said vertical plane, and means for moving said support frame vertically upwardly and downwardly such that at least a portion of each of said four rollers can be located in an active position above the working surface of said conveyor system or in an inactive position below said working surface.

2. A strapping machine as defined in claim 1, including a control system which automatically provides for the application of two spaced apart straps and in which between the first and the second strap the conveyor system moves the object to be strapped about the required distance under control of a control member, and wherein the control system operates such that the phase for the further transportation after the application of the first strap and prior to the second strap the upward movement of the frame with the object turning rollers, as well as the switching on of the conveyor system and the switching off of it and the downward movement of said frame takes place, so that the second strap is applied around the object after its rotation about 90°.

3. A strapping machine as defined in claim 1, wherein each of said four openings in the working surface of said conveyor system includes at least one transverse edge which extends transversely of said rectilinear direction and at least one outer longitudinal edge which extends longitudinally of said rectilinear direction, and wherein the working surface of said conveyor system comprises a plurality of endless belts which extend in parallel with one another in said rectilinear direction, at least one of said endless belts terminating its path of travel in said rectilinear direction at a transverse edge of a respective opening and at least one of said endless belts extending along said outer longitudinal edge of a respective opening.

4. A strapping machine as defined in claim 1, wherein each of said four rollers is in the form of a flat disc having circumferential grooves in its periphery, and wherein said two endless belts are mounted on said support frame to extend within the circumferential grooves in the respective rollers which they drive.

5. A strapping machine as defined in claim 4, including a rotatable drive shaft stationarily mounted near said support frame, said drive shaft including two drive discs around which said two endless belts are respectively wrapped, and wherein said support frame, which is vertically movable with respect to said drive shaft, includes a plurality of guide rollers around which said two endless belts are respectively wrapped, such that the tension on said endless belts will remain the same regardless of the relative positioning between said support frame and said drive shaft.

6. A strapping machine as defined in claim 5, wherein the upward movement of said support frame carrying the rollers of the object-turning mechanism takes place prior to the conveyor system being started.

* * * * *